United States Patent [19]
Kinoshita et al.

[11] Patent Number: 6,049,744
[45] Date of Patent: Apr. 11, 2000

[54] NUMERICAL CONTROL APPARATUS

[75] Inventors: Jiro Kinoshita; Kazunari Aoyama; Yoshiyuki Kubo; Yukio Okamura, all of Oshino-mura, Japan

[73] Assignee: Fanuc Ltd, Yamanashi, Japan

[21] Appl. No.: 08/817,412

[22] PCT Filed: Aug. 21, 1996

[86] PCT No.: PCT/JP96/02338

§ 371 Date: Apr. 16, 1997

§ 102(e) Date: Apr. 16, 1997

[87] PCT Pub. No.: WO97/08593

PCT Pub. Date: Mar. 6, 1997

[30] Foreign Application Priority Data

Aug. 22, 1995 [JP] Japan ................................. 7-212297

[51] Int. Cl.[7] .................................................. G06F 19/00
[52] U.S. Cl. ........................... 700/195; 700/159; 700/61
[58] Field of Search .................... 318/625, 574, 318/575, 562; 370/447; 700/9, 10, 61–65, 159, 169, 170, 195

[56] References Cited

U.S. PATENT DOCUMENTS

| | | | |
|---|---|---|---|
| 5,095,417 | 3/1992 | Hagiwara et al. | 364/138 |
| 5,204,669 | 4/1993 | Dorfe et al. | 340/825.52 |
| 5,268,898 | 12/1993 | Kazato | 370/447 |

FOREIGN PATENT DOCUMENTS

| | | |
|---|---|---|
| 0 510 204 A1 | 10/1992 | European Pat. Off. . |
| 0 777 167 A1 | 6/1997 | European Pat. Off. . |
| 59-208613 | 11/1984 | Japan . |
| 63-78206 | 4/1988 | Japan . |
| 1-195509 | 8/1989 | Japan ................................. 364/474.11 |
| 1-296306 | 11/1989 | Japan . |
| 4-143804 | 5/1992 | Japan . |
| 4-288603 | 10/1992 | Japan . |
| 6-35520 | 2/1994 | Japan . |
| 6-67718 | 3/1994 | Japan . |
| WO 88/09532 | 12/1988 | WIPO . |

OTHER PUBLICATIONS

Ruess R.; "Sercos–Interface auch fuer Sensoren und Aktoren"; Sep. 29, 1992; Elektronik, vol. 41, NR 20, pp. 66–68.

Kennel R., et al.; "Datenkommunikation Ueber das Bussystem" 'Sercos Interface'; Jul. 1, 1991, Automatisierungstechnische Praxis—ATP, vol. 33, NR. 7, pp. 363–368.

European Search Report for Application No. 96927867.0 dated Jul. 22, 1998.

*Primary Examiner*—Paul P. Gordon
*Assistant Examiner*—Steven R. Garland
*Attorney, Agent, or Firm*—Staas & Halsey LLP

[57] ABSTRACT

A machine-side position detection control unit (20) is provided in order to read a position feedback signal of a position detector (64) associated with a control axis (X axis) requiring machine-side position detection for controlling of a closed loop system. This makes unnecessary for providing a position detection control unit in a servoamplifier (30, 40, 50) for each axis. A numerical control unit (10) and the servoamplifier (30, 40, 50) for each axis are connected in a daisy chain form by a serial communication line.

9 Claims, 5 Drawing Sheets

NUMERICAL CONTROL APPARATUS

TECHNICAL FIELD

The present invention relates to a numerical control apparatus in which a numerical control unit and a servoamplifier are connected to each other by a serial communication line, and machine-side position control is carried out by feeding back a machine-side position.

BACKGROUND ART

A numerical control unit and a servoamplifier in a numerical control apparatus are usually connected to each other by a communication line. In such an apparatus, feedback control is widely employed. For example, for such a numerical control system, a semi-closed loop system is employed, in which a pulse coder is installed, as a position detector, to a servomotor for driving the movable part of the machine, such pulse coder being used for detecting a position signal from the control axis, and the position signal is fed back to control the position of the movable part of the machine.

On the other hand, the backlash amount of the control axis of numerical control apparatus varies depending on the work weight etc., and the accumulated error of the control axis also varies depending on the change in temperature. In such a case, in order to further enhance the accuracy of machine, not only the position is detected by the pulse coder, but also a system is employed in which the position is detected by a linear scale installed on the machine side as a machine-side position detector for detecting the position of the movable part of the machine to feed back the detected value. One of such systems is a full-closed loop system, which is used for machine tools requiring a specially high accuracy or large machine tools.

FIG. 5 is a schematic diagram of a conventional numerical control apparatus in which the position is detected by using the full-closed loop system. This numerical control apparatus comprises a numerical control unit 10, and an X-axis servoamplifier 130, a Y-axis servoamplifier 140, and a Z-axis servoamplifier 50, and an X-axis servomotor 60, a Y-axis servomotor 70, and a Z-axis servomotor 80 which are driven by these servoamplifiers.

Further, a ball nut 62 fixed to a tool rest 63 is screwed on an X-axis ball screw 61 connected to the output shaft of the X-axis servomotor 60. Also, the tool rest 63 is provided with a linear scale 64 as a machine-side position detector. The position feedback signal of the linear scale 64 is read by a machine-side position detection control section 30a installed in the X-axis servoamplifier 130, by which feedback control is carried out.

The machine-side position detection control section 30a is designed so as to be installed in a housing for the servoamplifier 130 as shown in FIG. 5. Therefore, a connector CN for detecting the machine-side position is installed in each of the housings of all the servoamplifiers 130, 140 and 140.

However, since all the control axes are not always subjected to position control, it is not necessary to install the machine-side position detection control section to all the servoamplifiers. If the connector CN for machine-side position detection is installed to all the servoamplifiers, the cost increases unnecessarily.

In some cases, in order to enhance the controllability of the servomotor, it is desired to feed back the data other than the machine-side position detected value by newly connecting a control line to the servoamplifier. However, there is a problem such that a connector cannot be installed newly because the size of the housing for the servoamplifier is limited.

DISCLOSURE OF THE INVENTION

An object of the present invention is to provide a numerical control apparatus with optimized number of connectors in servoamplifiers and improved controllability of servomotor.

To achieve the above object, the numerical control apparatus in accordance with the present invention comprises a numerical control unit; at least one machine-side position detector; at least one machine-side position detection control unit which is connected to the numerical control unit by a serial communication line, has at least one connector for receiving a detected signal from the machine-side position detector, and reads the signal received from the machine-side position detector via the connector and transmits the signal to the numerical control unit; and one servoamplifier connected to the machine-side position detection control unit via a serial communication line to control a servomotor.

Preferably, one servoamplifier is further connected to another servoamplifier by a serial communication line, and all of these servoamplifiers are connected to the numerical control unit in a daisy chain form by serial communication lines.

Thus, according to the present invention, for example, the detected signal cable from the position detector is not connected to the servoamplifier associated with the control axis, but is connected to the machine-side position detection control unit. Therefore, servoamplifiers need not to have a function for receiving and reading the signal from the machine-side position detector.

BEST MODE OF CARRYING OUT THE INVENTION

Figure 1:
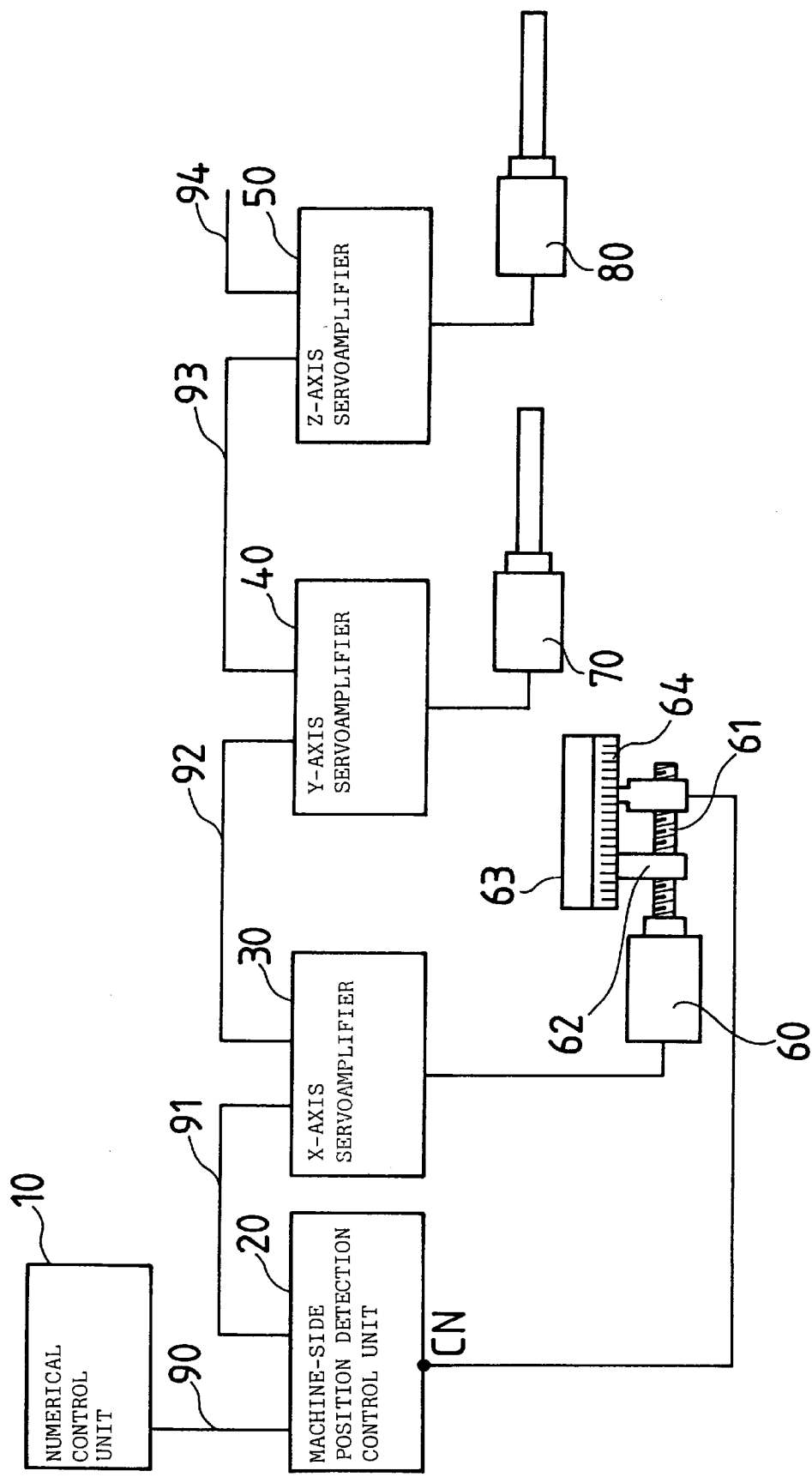
FIG. 1 is a block diagram showing the principle of a numerical control apparatus in accordance with the present invention.

First, the principle of a numerical control apparatus in accordance with the present invention will be described with reference to FIG. 1.

The numerical control apparatus (CNC) includes a numerical control unit 10, a machine-side position detection control unit 20 for carrying out feedback control of machine-side position detection, and an X-axis servoamplifier 30, a Y-axis servoamplifier 40, and a Z-axis servoamplifier 50, and an X-axis servomotor 60, a Y-axis servomotor 70, and a Z-axis servomotor 80 which are driven by these servoamplifiers.

Further, a ball nut 62 fixed to a tool rest 63 engages with an X-axis ball screw 61 connected to the output shaft of the X-axis servomotor 60. Also, the tool rest 63 is provided with a linear scale 64 as a machine-side position detector. The position feedback signal of the linear scale 64 is read by a machine-side position detection control unit 20, by which feedback control is carried out.

In the above description, since the control axis for which position is detected by the machine-side position detector (linear scale 64) is the X axis only, the machine-side position detection control unit 20 has one connector CN for machine-side position detection (corresponding to the X axis). However, this machine-side position detection control unit 20 can also have some other connectors besides this connector. The control axis to which the connector is made to correspond can be determined arbitrarily. For example, assuming that the machine-side position detection control unit 20 has two connectors CN1 and CN2 and the control axes for which position must be detected are the X and Y axes, CN1 and CN2 can receive the position feedback signals associated with the X and Y axes, respectively, or, by changing the setting, CN1 and CN2 can receive the position feedback signals associated with the Y and X axes, respectively.

The machine-side position detection control unit 20 and the numerical control unit 10 are connected to each other by a serial communication line 90. Likewise, the machine-side position detection control unit 20 and the X-axis servoamplifier 30 are connected to each other by a serial communication line 91, the X-axis servoamplifier 30 and the Y-axis servoamplifier 40 by a serial communication line 92, and the Y-axis servoamplifier 40 and the Z-axis servoamplifier 50 by a serial communication line 93. Further, the Z-axis servoamplifier 50 can be connected to another servoamplifier by a serial communication line 94.

Thus, the numerical control unit 10 and the servoamplifiers 30, 40, and 50 for the axes are connected in a daisy chain form. For any of the serial communication lines 90, 91, . . . , an optical fiber cable, which enables broad-band transmission and noise reduction, is used, and packet communication is carried out on this transmission line.

Figure 2:
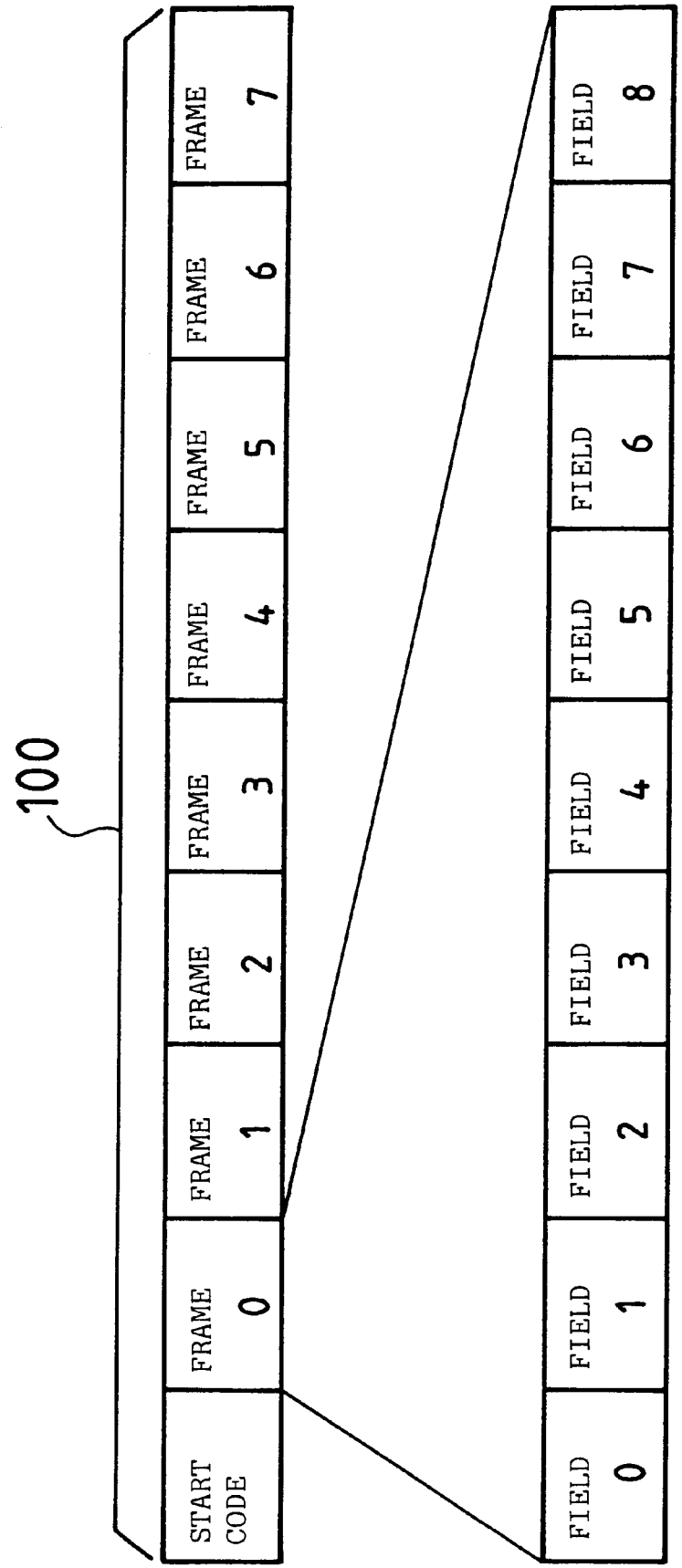
FIG. 2 is a diagram showing a format of a communication packet.

Next, the format of the communication packet will be described with reference to FIG. 2. The communication packet 100 is composed of a start code telling the start of packet and frames 0 to 7. Each frame is divided into units of information called fields. Each field carries the data to/from each servoamplifiers and the machine-side position detection control unit. For example, in the case of a numerical control apparatus including eight servoamplifiers at a maximum and one machine-side position detection control unit, one frame is composed of nine fields containing field 0 to field 8. The fields 0 to 8 can be assigned to the data of the servoamplifiers and the machine-side position detection control unit arbitrarily.

Figure 3:
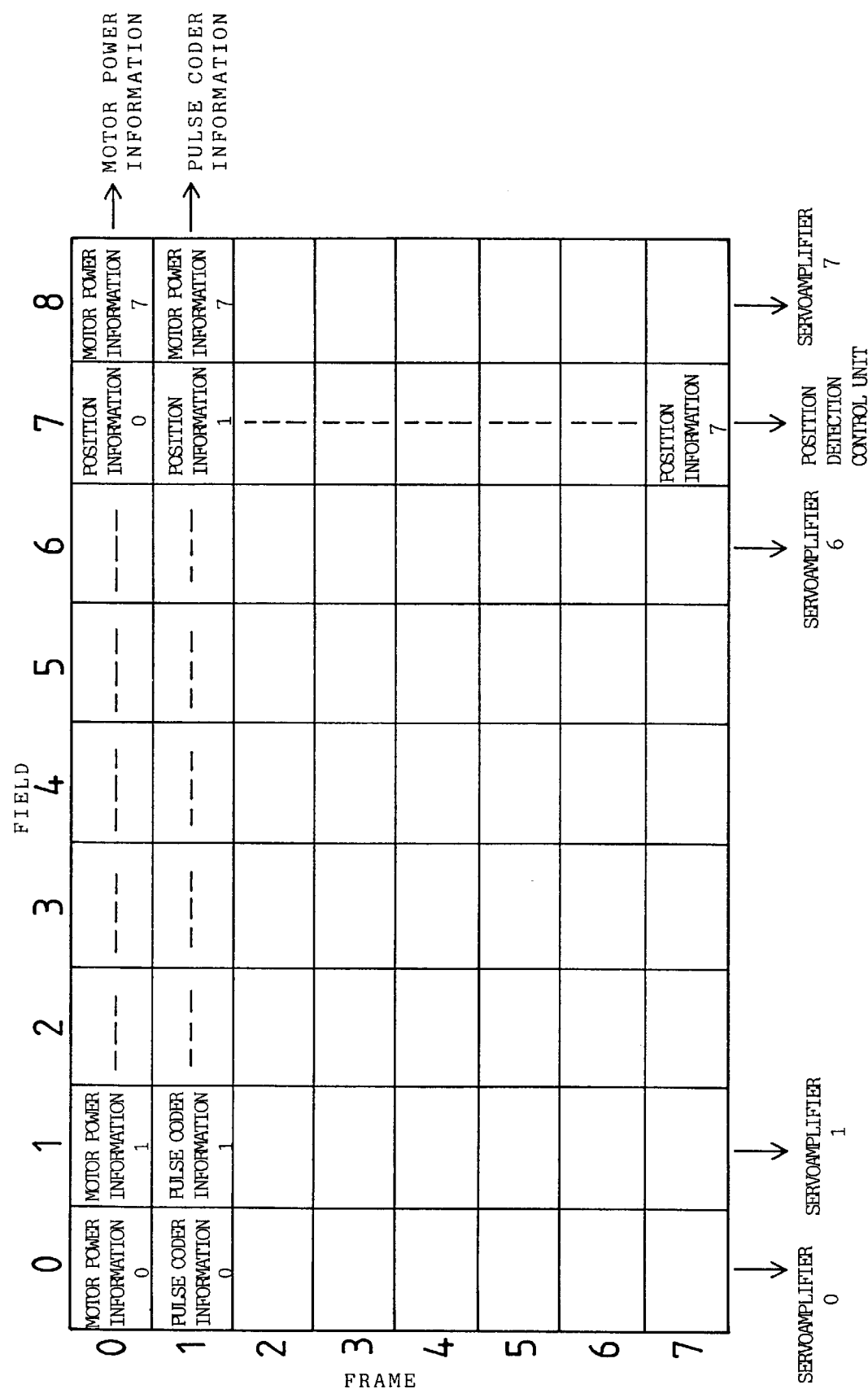
FIG. 3 is a table showing the details of the interior of the communication packet.

Next, the details of the interior constitution of the communication packet 100 will be described with reference to FIG. 3. This diagram shows a packet sent from the servoamplifiers and the machine-side position detection control unit to the numerical control unit in the case where the numerical control apparatus has eight servoamplifiers (servoamplifier 0, servoamplifier 1, . . . , servoamplifier 8) and one machine-side position detection control unit 20. Each of frames 0 to 7 is divided into nine fields for each of fields 0 to field 8, and one frame corresponds to the data content of one unit. For example, frame 0 contains the motor power information, frame 1 the pulse coder information, and so on. Also, one field corresponds to any one of the servoamplifiers 30, 40, and 50 and the machine-side position detection control unit 20. For example, according to FIG. 3, field 0 corresponds to servoamplifier 0, field 1 to servoamplifier 1, the rest corresponding similarly, and field 6 corresponds to servoamplifier 6. Field 7 corresponds to the machine-side position detection control unit, and the last field 8 corresponds to servoamplifier 7.

Accordingly, at the position of field 0 in frame 0, motor power information 0 of a servomotor controlled by servoamplifier 0 is inserted. At the position of field 1 in frame 0, motor power information 1 of a servomotor controlled by servoamplifier 1 is inserted. Similarly, at the position of field 8, which is the final field, in frame 0, motor power information 7 of a servomotor controlled by servoamplifier 7 is inserted. However, even in frame 0 showing the motor power information, inserted at the position of field 7 is position information 0 of the control axis controlled by servoamplifier 0. This position information 0 is the value detected by the machine-side position detection control unit 20. If the control axis controlled by servoamplifier 0 is one whose position need not be detected, this field 7 is not set.

At the position of field 0 in frame 1, pulse coder information 0 of a servomotor controlled by servoamplifier 0 is inserted, and at the position of field 1 in frame 1, pulse coder information 1 of a servomotor controlled by servoamplifier 1 is inserted. Similarly, at the position of field 8, which is the final field in frame 1, pulse coder information 7 of a servomotor controlled by servoamplifier 7 is inserted. However, even frame 1 is a frame showing the pulse coder information, as described above, position information 1 of the control axis controlled by servoamplifier 1 is inserted at the position of field 7. This position information 1 is the value detected by the machine-side position detection control unit. If the control axis controlled by servoamplifier 1 is one whose position need not be detected, this field 7 is not set.

As described above, the packet is constructed by making the necessary data contents correspond to the frames and by making the servoamplifiers and machine-side position detection control unit correspond to the fields, by which packet communication is carried out.

Figure 4:
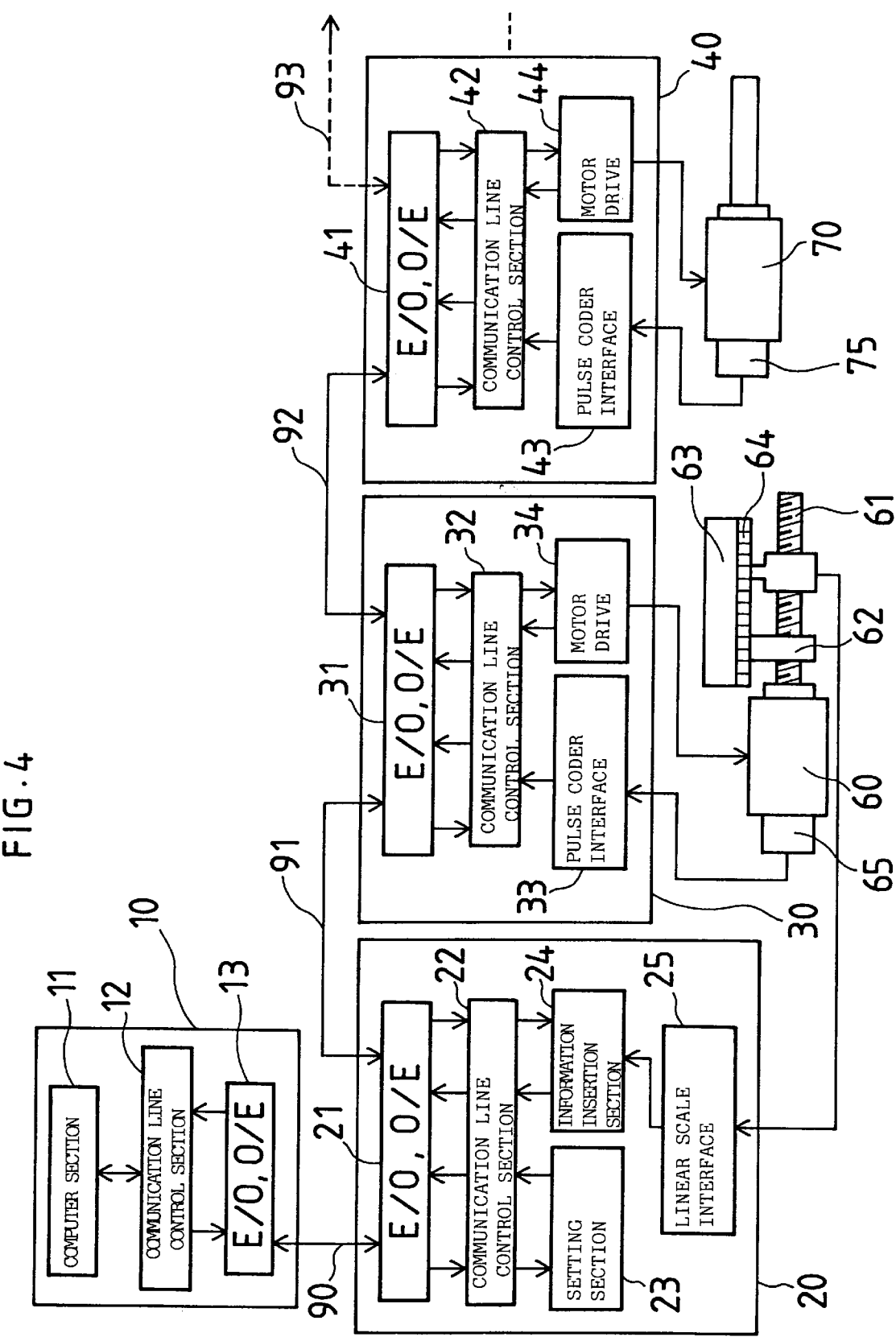
FIG. 4 is a detailed diagram of an inside configuration of a numerical control apparatus in accordance with the present invention.
Figure 5:
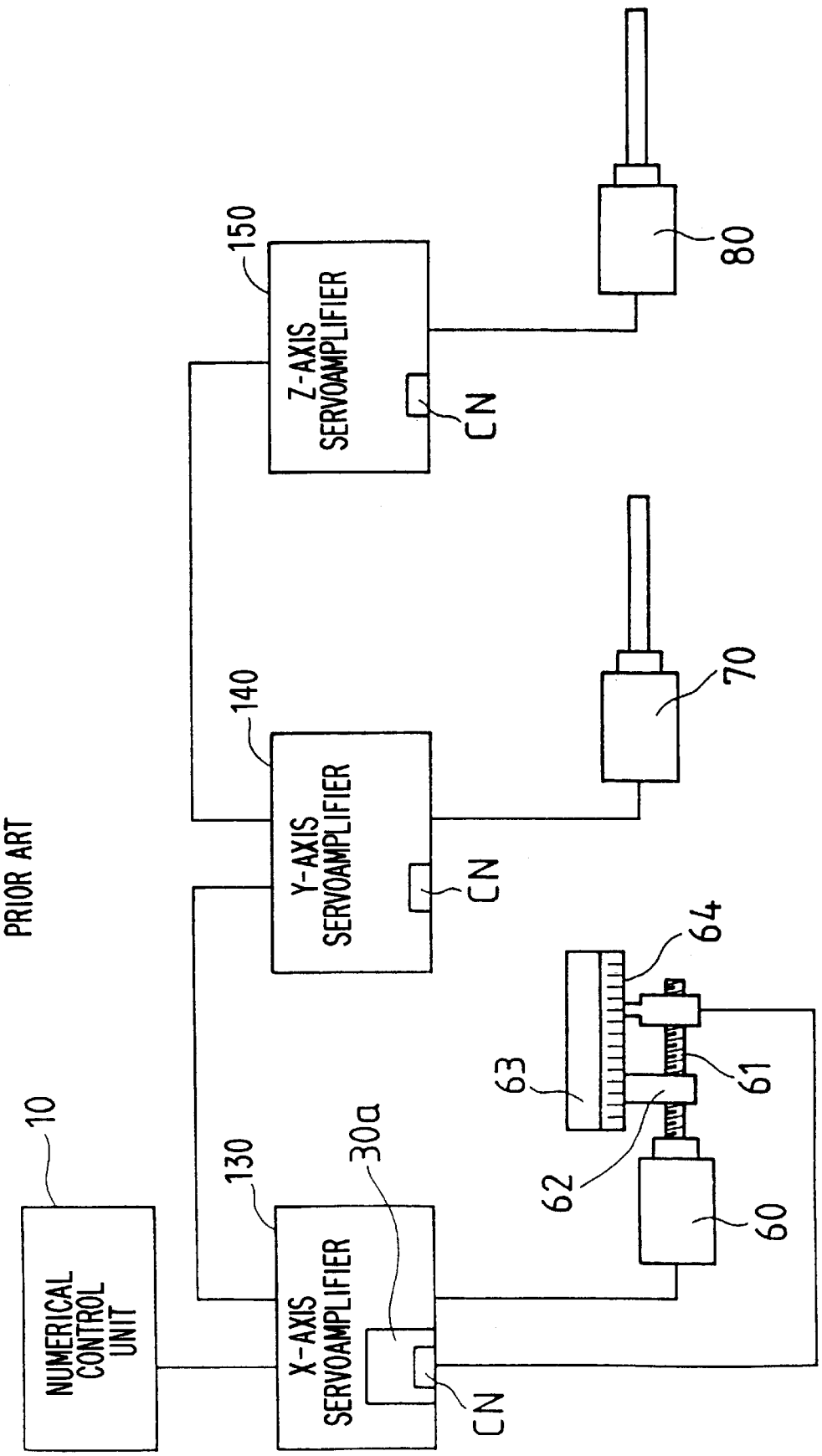
FIG. 5 is a block diagram showing the principle of a conventional numerical control apparatus.

Next, an inside configuration of a numerical control apparatus in accordance with one embodiment of the present invention will be described in detail with reference to FIG. 4.

The numerical control apparatus includes a numerical control unit 10, a machine-side position detection control unit 20, an X-axis servoamplifier 30, and a Y-axis servoamplifier 40. The numerical control unit 10 is connected to the machine-side position detection control unit 20 by a serial communication line 90. Likewise, the machine-side position detection control unit 20 is connected to the X-axis servoamplifier 30 by a serial communication line 91, and further the X-axis servoamplifier 30 is connected to the Y-axis servoamplifier 40 by a serial communication line 92. Only two servoamplifiers are shown in this figure for simplicity. In practice, however, necessary number of servoamplifiers can be connected in a daisy chain form by serial communication lines. Connected to these servoamplifiers are an X-axis servomotor 60 and a Y-axis servomotor 70. Further, a ball nut 62 fixed to a tool rest 63 engages with an X-axis ball screw 61 connected to the output shaft of the X-axis servomotor 60. Also, the tool rest 63 is provided with a linear scale 64.

The numerical control unit 10 includes a computer section 11 for controlling all the basic functions of the numerical control apparatus, a communication line control section 12 for controlling the communication protocol, and an electrical signal/optical signal (E/O), optical signal/electrical signal (O/E) conversion section 13.

The computer section 11 controls the whole of packet communication carried out in the communication network. The communication line control section 12 assembles the transmitted data into a packet form. It also disassembles the received packet into the original data form. The E/O, O/E conversion section 13 is an interface of the transmission line, which converts an electrical signal to an optical signal or an optical signal to an electrical signal. E/O, O/E conversion sections in other blocks operate in the same way, so that the description of the operation of the E/O, O/E conversion sections in other blocks is omitted. The machine-side position detection control unit 20 includes a setting section 23 of the machine-side position detection control unit for setting various detection data, a communication line control section 22, a machine-side position information insertion section 24 for inserting machine-side position detection information into a communication packet, a linear scale interface 25, and an E/O, O/E conversion section 21.

The setting section 23 of the machine-side position detection control unit can arbitrarily set a control axis to be detected, and controls all the functions of the machine-side position detection control unit 20. The communication line control section 22 performs the disassembly and assembly of communication packet. The machine-side position information insertion section 24 inserts the detected value of the machine-side position in the field which is set in the communication packet. The linear scale interface 25 reads the graduations of the linear scale 64 installed on the tool rest 63 to detect the position of the tool rest 63. Also, the machine-side position detection control unit 20 can not only input the feedback information of the detected value of the machine-side position but also input the temperature data, correction data, etc. as the feedback information necessary for enhancing the controllability of the servomotor. It can also carry out the control based on various kinds of feedback information as well as the position control.

The X-axis servoamplifier 30 includes a communication line control section 32, a pulse coder interface 33, a motor drive 34, and an E/O, O/E conversion section 31.

The pulse coder interface 33 includes a counter. The counter counts the pulse train from the pulse coder 65 installed on the servomotor 60 to detect the rotational speed of servomotor and the position of control axis. The motor drive 34 is composed of a converter and an inverter. The converter takes out an alternating current from a commercial power line, and converts it into a direct current of a specified voltage. The inverter, using this direct current as a power source, outputs a motor current in accordance with the current command given by the communication line control section 32. The current flowing in the servomotor 60 is detected by the detection circuit in the motor drive 34, and fed back to the communication line control section 32. The communication line control section 32 also has a function for disassembling and assembling the communication packet.

The Y-axis servoamplifier 40 includes a communication line control section 42, a pulse coder interface 43, a motor drive 44, and an E/O, O/E conversion section 41.

Like the X-axis servoamplifier 30, the pulse coder interface 43 has a counter installed therein. The counter counts the pulse train from the pulse coder 75 installed on the servomotor 70 to detect the rotational speed of servomotor and the position of control axis. The motor drive 44 is composed of a converter and an inverter. The converter takes out an alternating current from a commercial power line, and converts it into a direct current of a specified voltage. The inverter, using this direct current as a power source, outputs a motor current in accordance with the current command given by the communication line control section 42. The current flowing in the servomotor is detected by the detection circuit in the motor drive, and fed back to the communication line control section 42. The communication line control section 42 also has a function for disassembling and assembling the communication packet.

In the example shown in this figure, one machine-side position detection control unit 20 is connected to the numerical control unit 10 and the servoamplifier 30. However, the numerical control apparatus can be configured so that a plurality of machine-side position detection control units are connected to the numerical control unit 10 and the servoamplifiers in a daisy chain form by using serial communication lines.

In the present invention, as described above, the machine-side position detection section is not provided in the servoamplifier, but is provided on the serial communication line as a machine-side position detection control unit. Thus, not all the servoamplifiers need to have a connector for machine-side position detection, contributing to the reduction of the cost. When it is necessary to enhance the operating accuracy of the machine by giving information about the temperature on the machine side, the distortion of the table, etc. to the numerical control apparatus, an interface for receiving the output from the sensor which detects these kinds of information can be provided in the machine-side position detection control unit.

We claim:

1. A numerical control apparatus, comprising:
    a numerical control unit;
    a servoamplifier for each axis, which drives and controls a servomotor;
    at least one machine-side position detector for detecting the position of a movable part of a machine driven by said servomotor; and
    at least one machine-side position detection control unit which is connected to said numerical control unit and said servoamplifier respectively by serial communication lines, has at least one connector for receiving a position detected signal from said machine-side position detector, and reads the detected signal received from said machine-side position detector via said connector to transmit said detected signal to said numerical control unit, wherein each of a plurality of connectors included in said machine-side position detection control unit can be made to correspond to any axis.

2. A numerical control apparatus according to claim 1, wherein said servoamplifier for each axis and said at least one machine-side position detection control unit are all connected to said numerical control unit in a daisy chain form.

3. A numerical control apparatus according to claim 1, wherein the communication carried out on said serial communication lines is packet communication.

4. A numerical control apparatus according to claim 3, wherein said numerical control unit has a communication line control section for assembling data to be transmitted to said at least one machine-side position detection control unit into a packet form, and for disassembling the data of packet form received from said at least one machine-side position detection control unit into the original data.

5. A numerical control apparatus according to claim 1, wherein said at least one machine-side position detection control unit comprises a plurality of machine-side position detection control units connected to said numerical control unit and said servoamplifier in a daisy chain form by serial communication lines.

6. A numerical control apparatus, comprising:

a numerical control unit;

a servoamplifier for each axis, which drives and controls a servomotor;

at least one machine-side position detector for detecting the position of a movable part of a machine driven by said servomotor; and at least one machine-side position detection control unit which is connected to said numerical control unit and said servoamplifier respectively by serial communication lines, has at least one connector for receiving a position detected signal from said machine-side position detector, and reads the detected signal received from said machine-side position detector via said connector to transmit said detected signal to said numerical control unit, wherein said machine-side position detection control unit has an interface for receiving a detected signal, other than the position detected signal, which is necessary for enhancing the controllability of the servomotor, in addition to the connector for receiving the position detected signal from said machine-side position detector.

7. A numerical control apparatus according to claim 6, wherein the detected signal other than position detected signal includes signals for a detected temperature or correction data.

8. A numerical control apparatus, comprising:

a numerical control unit;

a servoamplifier for each axis, which drives and controls a servomotor;

at least one machine-side position detector for detecting the position of a movable part of a machine driven by said servomotor; and at least one machine-side position detection control unit which is connected to said numerical control unit and said servoamplifier respectively by serial communication lines, has at least one connector for receiving a position detected signal from said machine-side position detector, and reads the detected signal received from said machine-side position detector via said connector to transmit said detected signal to said numerical control unit, wherein said machine-side position detection control unit has a setting section capable of setting various detection data and arbitrarily setting various ones of control axes to be detected.

9. A numerical control apparatus according to claim 8, wherein said machine-side position detection control unit has a machine-side position information insertion section for inserting the machine-side detected value obtained, through a connector, by reading the signal received from the machine-side position detector in a field which is set in a communication packet.

\* \* \* \* \*